United States Patent
Yeung et al.

(10) Patent No.: US 11,511,261 B2
(45) Date of Patent: Nov. 29, 2022

(54) MOISTURE-RESISTANT CATALYST FOR AIR POLLUTION REMEDIATION AND METHOD OF MAKING THE SAME

(71) Applicant: THE HONG KONG UNIVERSITY OF SCIENCE AND TECHNOLOGY, Hong Kong (CN)

(72) Inventors: King Lun Yeung, Hong Kong (CN); Wei Han, Hong Kong (CN); Hao Chen, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 160 days.

(21) Appl. No.: 16/825,254

(22) Filed: Mar. 20, 2020

(65) Prior Publication Data

US 2020/0298210 A1    Sep. 24, 2020

Related U.S. Application Data

(60) Provisional application No. 62/919,596, filed on Mar. 21, 2019.

(51) Int. Cl.

| | |
|---|---|
| *B01D 53/86* | (2006.01) |
| *B01J 23/22* | (2006.01) |
| *B01D 53/02* | (2006.01) |
| *B01J 37/02* | (2006.01) |
| *B01J 37/08* | (2006.01) |
| *B01J 35/10* | (2006.01) |
| *B01J 21/08* | (2006.01) |

(52) U.S. Cl.
CPC .............. *B01J 23/22* (2013.01); *B01D 53/02* (2013.01); *B01D 53/865* (2013.01); *B01D 53/8634* (2013.01); *B01J 35/1023* (2013.01); *B01J 37/0201* (2013.01); *B01J 37/0236* (2013.01); *B01J 37/08* (2013.01); *B01D 2258/06* (2013.01); *B01J 21/08* (2013.01); *D06M 2200/12* (2013.01)

(58) Field of Classification Search
None
See application file for complete search history.

(56) References Cited

U.S. PATENT DOCUMENTS

| | | | |
|---|---|---|---|
| 6,099,819 A | 8/2000 | Srinivas et al. | |
| 7,578,985 B2 | 8/2009 | Aderhold, Jr. et al. | |
| 8,222,302 B2 | 7/2012 | Yeung et al. | |
| 8,242,049 B2 | 8/2012 | Yeung et al. | |
| 2003/0194366 A1 | 10/2003 | Srinivas et al. | |
| 2005/0053534 A1* | 3/2005 | Liu ..................... | B01D 53/9431 423/239.1 |
| 2007/0204870 A1* | 9/2007 | Deevi ..................... | B01J 37/16 502/355 |
| 2010/0300053 A1* | 12/2010 | Alary ..................... | C04B 35/565 428/116 |
| 2015/0165418 A1* | 6/2015 | Kearl ..................... | B01D 53/9431 422/180 |

FOREIGN PATENT DOCUMENTS

| | | |
|---|---|---|
| CN | 102211025 A | 10/2011 |
| CN | 106377984 A | 2/2017 |

OTHER PUBLICATIONS

Azalim et al. "Removal of oxygenated volatile organic compounds by catalytic oxidation over Zr—Ce—Mn catalysts." Journal of hazardous materials 188.1-3 (2011): 422-427.
Zhang et al. "Low-temperature catalysis for VOCs removal in technology and application: A state-of-the-art review." Catalysis Today 264 (2016): 270-278.

* cited by examiner

*Primary Examiner* — Sheng H Davis
(74) *Attorney, Agent, or Firm* — Nath, Goldberg & Meyer; Joshua B. Goldberg (57) ABSTRACT

The moisture-resistant catalyst for air pollution remediation is a catalyst with moisture-resistant properties, and which is used for removing nitrogen compound pollutants, such as ammonia ($NH_3$), from air. The moisture-resistant catalyst for air pollution remediation includes at least one metal oxide catalyst, at least one inorganic oxide support for supporting the at least one metal oxide catalyst, and a porous framework for immobilizing the at least one metal oxide catalyst and the at least one inorganic oxide support, where the porous framework is moisture-resistant. As non-limiting examples, the at least one metal oxide catalyst may be supported on the at least one inorganic oxide support by precipitation, impregnation, dry milling, ion-exchange or combinations thereof. The at least one metal oxide catalyst supported on the at least one inorganic oxide support may be physically embedded in the porous framework.

30 Claims, 9 Drawing Sheets

MOISTURE-RESISTANT CATALYST FOR AIR POLLUTION REMEDIATION AND METHOD OF MAKING THE SAME

CROSS-REFERENCE TO RELATED APPLICATION

This application claims the benefit of U.S. Provisional Patent Application No. 62/919,596, filed on Mar. 21, 2019.

BACKGROUND

1. Field

The disclosure of the present patent application relates to the removal of nitrogen compound pollutants, such as ammonia ($NH_3$), from air, and particularly to a moisture-resistant catalyst for air pollution remediation and, further, to general methods of making moisture-resistant catalysts.

2. Description of the Related Art

Nitrogen-containing pollutants, such as ammonia, are not only among the most common of air pollutants, but they are often quite odoriferous. Such odors can be extremely detrimental to the general quality of life, causing not only psychological stress but also physical symptoms, such as insomnia, loss of appetite, etc. Nitrogen-containing compounds such as ammonia and organoamines are common sources of odors coming from household food waste, air conditioning systems, garbage dumps, recycling centers, wastewater treatment plants and sewer systems. Such compounds are often generated via the anaerobic decomposition of organic nitrogen-containing waste by microorganisms. Ammonia, in particular, has a high odor threshold (1.5 ppm), and is known to cause nausea and lung irritation. Exposure to ammonia at very high concentrations can result in permanent lung damage and even death. Ammonia is also toxic to aquatic organisms, especially under conditions of low oxygen concentration. Further, some aromatic amines have been found to be carcinogenic.

There are numerous techniques for solving odor problems caused by anaerobic microorganisms. The dilution of contaminated air with fresh air can lower the concentrations of ammonia and organoamines to below their odor thresholds. Additionally, frequent cleaning and disinfection can decrease the number of odor-causing microorganisms. More fundamental methods for ammonia removal in sewer systems include chemical precipitation, using magnesium phosphate, and chemical disinfection using controlled-release gel. Adsorption-based methods do not require the usage of chemicals and can be combined with biofiltration processes for odor removal. However, the adsorption efficiency of conventional zeolite-based and activated carbon-based adsorbents for ammonia is low, and frequent maintenance is required due to the saturation and degradation of the adsorbent layer.

Of particular interest is the catalytic oxidation process, which can significantly decrease the operating temperature of the thermal oxidation process and is a cost-effective method for odor removal. Despite the benefits of catalytic oxidation processes, they have been difficult to implement on a large scale, due to low catalytic activity under near-ambient conditions and poor selectivity for complete mineralization (i.e., no nitrogen oxide products). It would be desirable to be able to take advantage of the benefits of catalytic oxidation under near-ambient conditions for complete mineralization of ammonia and organoamines. Thus, a moisture-resistant catalyst for air pollution remediation and a method of making the same solving the aforementioned problems are desired.

SUMMARY

The moisture-resistant catalyst for air pollution remediation is a catalyst with moisture-resistant properties, and which is used for removing nitrogen compound pollutants, such as ammonia ($NH_3$), from air. The moisture-resistant catalyst for air pollution remediation includes at least one metal oxide catalyst, at least one inorganic oxide support for supporting the at least one metal oxide catalyst, and a porous framework for immobilizing the at least one metal oxide catalyst and the at least one inorganic oxide support, where the porous framework is moisture-resistant. As non-limiting examples, the at least one metal oxide catalyst may be supported on the at least one inorganic oxide support by precipitation, impregnation, dry milling, ion-exchange or combinations thereof. The at least one metal oxide catalyst supported on the at least one inorganic oxide support may be physically embedded in the porous framework.

The moisture-resistant catalyst for air pollution remediation may be used for selective catalytic oxidation of nitrogen-containing compounds into nitrogen, carbon dioxide and water. Alternatively, the moisture-resistant catalyst for air pollution remediation may be used to catalyze the oxidation of ammonia in air into nitrogen and water. As a further alternative, the moisture-resistant catalyst for air pollution remediation may be used to catalyze the oxidation of organoamines in air into nitrogen, carbon dioxide and water. Due to the moisture resistance of the porous framework, the moisture-resistant catalyst for air pollution remediation can be operated at normal operating temperatures at a relative humidity (RH) ranging between 0% and 100%.

The at least one metal oxide catalyst may be an oxide from Group IB (copper, silver or gold), Group IIB (zinc, cadmium or mercury), Group IIIB (scandium, yttrium, lanthanum or cerium), Group IVB (titanium, zirconium, hafnium or rutherfordium), Group VB (vanadium, niobium, tantalum or dubnium), Group VIB (chromium, molybdenum, tungsten or seaborgium), Group VIIB (manganese, technetium, rhenium or bohrium), Group VIIIB (iron, ruthenium, osmium, hassium, cobalt, rhodium, iridium, meitnerium, nickel, palladium, platinum or darmstadtium) or combinations thereof. Alternatively, the at least one metal oxide catalyst may be an oxide of copper, zinc, yttrium, lanthanum, cerium, titanium, zirconium, vanadium, chromium, manganese, iron, cobalt, nickel or combinations thereof.

The at least one inorganic oxide support may be an oxide from Group IIIA (aluminum, gallium, indium, thallium or nihonium), Group IVA (silicon, germanium, tin, lead or flerovium), Group IVB (titanium, zirconium, hafnium or rutherfordium) or combinations thereof. Alternatively, the at least one inorganic oxide support may be an oxide of aluminum, silicon, titanium, zirconium or combinations thereof.

The porous framework prevents penetration of water droplets and moisture, and may be a hydrophobic material for repelling the water droplets and moisture. The porous framework may also have relatively narrow pores, which surround the catalyst, for preventing penetration by the water droplets and moisture. The porous framework may be an inorganic aerogel, for example, a silica aerogel, a titania-silica aerogel, a silicon nitride aerogel, a graphene aerogel, a carbon aerogel or an aerogel formed from carbonaceous materials that exhibit intrinsic hydrophobic properties or are modified or functionalized to exhibt hydrophobic properties. As non-limiting examples, the modification and/or functionalization may involve the use of silanes, such as methyltrimethoxysilane, methyltriethoxysilane, phenyltrimethoxysilane, or hexamethyldisilazane.

Alternatively, the porous framework may be a porous polymer matrix formed from at least one hydrophobic polymer, for example, polyacrylates, polyamides, polycarbonates, polyfluorocarbons, polystyrenes, polyimides, resorcinol-formaldehyde polymers or combinations thereof. As a further alternative, the porous framework may be a mixed inorganic and organic matrix, including at least one hydrophobic polymer and at least one inorganic component, for example, silica, titania-silica, silicon nitride, graphene, carbon or carbonaceous materials that exhibit intrinsic hydrophobic properties or are modified or functionalized to exhibt hydrophobic properties. As non-limiting examples, the modification and/or functionalization may involve the use of silanes, such as methyltrimethoxysilane, methyltriethoxysilane, phenyltrimethoxysilane, or hexamethyldisilazane.

The moisture-resistant catalyst for air pollution remediation may also include a promoter, for example, a promoter belonging to Group IVB (titanium, zirconium, hafnium or rutherfordium), Group VB (vanadium, niobium, tantalum or dubnium) or combinations thereof. Additionally, the moisture-resistant catalyst for air pollution remediation may also include a stabilizer, for example, a stabilizer belonging to Group IIIA (boron, aluminum, gallium, indium, thallium or nihonium), Group IVA (carbon, silicon, germanium, tin, lead or flerovium), Group IVB (titanium, zirconium, hafnium or rutherfordium) or combinations thereof. Further, the moisture-resistant catalyst for air pollution remediation may also include an inhibitor, for example, an inhibitor belonging to Group IB (copper, silver or gold), Group IIIB (scandium, yttrium, lanthanum or cerium), Group VIIIB (iron, ruthenium, osmium, hassium, cobalt, rhodium, iridium, meitnerium, nickel, palladium, platinum or darmstadtium) or combinations thereof.

The moisture-resistant catalyst for air pollution remediation may be made using a one-pot synthesis method. The at least one metal oxide catalyst and the at least one inorganic oxide support are initially dispersed into a sol, which may be an inorganic sol (e.g., metal oxides, graphene derivatives or the like), an organic sol (e.g., polymers), or an inorganic-organic hybrid sol (e.g., silicone, a metal oxide-polymer or the like). This forms a sol with an added catalyst. A condensation agent or a crosslinking agent is then added to the sol with the added catalyst to produce a catalyst-containing gel. The particular sol-gel process for producing the catalyst-containing gel is dependent upon whether the sol is an inorganic sol, an organic sol or an inorganic-organic hybrid sol. The moisture-resistant catalyst is then obtained through drying (e.g., supercritical drying, freeze drying, conventional drying or the like) and an appropriate thermal treatment processes to remove water and solvents within the catalyst-containing gel.

Alternatively, the moisture-resistant catalyst for air pollution remediation may be made using an impregnation method, where the at least one metal oxide catalyst is immobilized on the at least one inorganic oxide support. The at least one inorganic oxide support is initially dispersed into a sol, which may be an inorganic sol (e.g., metal oxides, graphene derivatives or the like), an organic sol (e.g., polymers), or an inorganic-organic hybrid sol (e.g., silicone, a metal oxide-polymer or the like). This forms a sol with an added support. A condensation agent or a crosslinking agent is then added to the sol with the added support to produce a support-containing gel. The particular sol-gel process for producing the support-containing gel is dependent upon whether the sol is an inorganic sol, an organic sol or an inorganic-organic hybrid sol. The support-containing gel is then dried (e.g., supercritical drying, freeze drying, conventional drying or the like) to form a support-containing aerogel, and the at least one metal oxide catalyst is then immobilized on the support-containing aerogel through conventional impregnation. Further drying and appropriate thermal treatment process(es) are then applied to produce the moisture-resistant catalyst. This impregnation-based method can avoid the adverse effect of complex synthesis systems to prepare the moisture-resistant catalyst with more accessible catalytic active sites.

As a further alternative, the moisture-resistant catalyst for air pollution remediation may be made using mixing combined with catalyst surface modification. The at least one metal oxide catalyst is initially dispersed into a sol, which may be an inorganic sol (e.g., metal oxides, graphene derivatives or the like), an organic sol (e.g., polymers), or an inorganic-organic hybrid sol (e.g., silicone, a metal oxide-polymer or the like). This forms a sol with an added catalyst. A condensation agent or a crosslinking agent is then added to the sol with the added catalyst to produce a catalyst-containing gel. The particular sol-gel process for producing the catalyst-containing gel is dependent upon whether the sol is an inorganic sol, an organic sol or an inorganic-organic hybrid sol. The moisture-resistant catalyst is then obtained through drying (e.g., supercritical drying, freeze drying, conventional drying or the like) and an appropriate thermal treatment processes to remove water and solvents within the catalyst-containing gel.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The moisture-resistant catalyst for air pollution remediation is a catalyst with moisture-resistant properties, and which is used for removing nitrogen compound pollutants, such as ammonia ($NH_3$), from air. The moisture-resistant catalyst for air pollution remediation includes at least one metal oxide catalyst, at least one inorganic oxide support for supporting the at least one metal oxide catalyst, and a porous framework for the at least one metal oxide catalyst and the at least one inorganic oxide support, where the porous framework is moisture-resistant. As non-limiting examples, the at least one metal oxide catalyst may be supported on the at least one inorganic oxide support by precipitation, impregnation, dry milling, ion-exchange or combinations thereof. The at least one metal oxide catalyst supported on the at least one inorganic oxide support may be physically embedded in the porous framework.

The moisture-resistant catalyst for air pollution remediation may be used for selective catalytic oxidation of nitrogen-containing compounds into nitrogen, carbon dioxide and water. Alternatively, the moisture-resistant catalyst for air pollution remediation may be used to catalyze the oxidation of ammonia in air into nitrogen and water. As a further alternative, the moisture-resistant catalyst for air pollution remediation may be used to catalyze the oxidation of organoamines in air into nitrogen, carbon dioxide and water. Due to the moisture resistance of the porous framework, the moisture-resistant catalyst for air pollution remediation can operate at normal operating temperatures at a relative humidity (RH) ranging between 0% and 100%.

The at least one metal oxide catalyst may be an oxide from Group IB (copper, silver or gold), Group IIB (zinc, cadmium or mercury), Group IIIB (scandium, yttrium, lanthanum or cerium), Group IVB (titanium, zirconium, hafnium or rutherfordium), Group VB (vanadium, niobium, tantalum or dubnium), Group VIB (chromium, molybdenum, tungsten or seaborgium), Group VIIB (manganese, technetium, rhenium or bohrium), Group VIIIB (iron, ruthenium, osmium, hassium, cobalt, rhodium, iridium, meitnerium, nickel, palladium, platinum or darmstadtium) or combinations thereof. Alternatively, the at least one metal oxide catalyst may be an oxide of copper, zinc, yttrium, lanthanum, cerium, titanium, zirconium, vanadium, chromium, manganese, iron, cobalt, nickel or combinations thereof.

The at least one inorganic oxide support may be an oxide from Group IIIA (aluminum, gallium, indium, thallium or nihonium), Group IVA (silicon, germanium, tin, lead or flerovium), Group IVB (titanium, zirconium, hafnium or rutherfordium) or combinations thereof. Alternatively, the at least one inorganic oxide support may be an oxide of aluminum, silicon, titanium, zirconium or combinations thereof.

The porous framework prevents penetration of water droplets and moisture, and may be a hydrophobic material for repelling the water droplets and moisture. The porous framework may also have relatively narrow pores, which surround the catalyst, for preventing penetration by the water droplets and moisture. The porous framework may be an inorganic aerogel, for example, a silica aerogel, a titania-silica aerogel, a silicon nitride aerogel, a graphene aerogel, a carbon aerogel or an aerogel formed from carbonaceous materials that exhibit intrinsic hydrophobic properties or are modified or functionalized to exhibt hydrophobic properties. As non-limiting examples, the modification and/or functionalization may involve the use of silanes, such as methyltrimethoxysilane, methyltriethoxysilane, phenyltrimethoxysilane, or hexamethyldisilazane.

Alternatively, the porous framework may be a porous polymer matrix formed from at least one hydrophobic polymer, for example, polyacrylates, polyamides, polycarbonates, polyfluorocarbons, polystyrenes, polyimides, resorcinol-formaldehyde polymers or combinations thereof. As a further alternative, the porous framework may be a mixed inorganic and organic matrix, including at least one hydrophobic polymer and at least one inorganic component, for example, silica, titania-silica, silicon nitride, graphene, carbon or carbonaceous materials that exhibit intrinsic hydrophobic properties or are modified or functionalized to exhibt hydrophobic properties. As non-limiting examples, the modification and/or functionalization may involve the use of silanes, such as methyltrimethoxysilane, methyltriethoxysilane, phenyltrimethoxysilane, or hexamethyldisilazane.

The moisture-resistant catalyst for air pollution remediation may also include a promoter, for example, a promoter belonging to Group IVB (titanium, zirconium, hafnium or rutherfordium), Group VB (vanadium, niobium, tantalum or dubnium) or combinations thereof. Additionally, the moisture-resistant catalyst for air pollution remediation may also include a stabilizer, for example, a stabilizer belonging to Group IIIA (boron, aluminum, gallium, indium, thallium or nihonium), Group IVA (carbon, silicon, germanium, tin, lead or flerovium), Group IVB (titanium, zirconium, hafnium or rutherfordium) or combinations thereof. Further, the moisture-resistant catalyst for air pollution remediation may also include an inhibitor, for example, an inhibitor belonging to Group IB (copper, silver or gold), Group IIIB (scandium, yttrium, lanthanum or cerium), Group VIIIB (iron, ruthenium, osmium, hassium, cobalt, rhodium, iridium, meitnerium, nickel, palladium, platinum or darmstadtium) or combinations thereof.

Figure 9A:
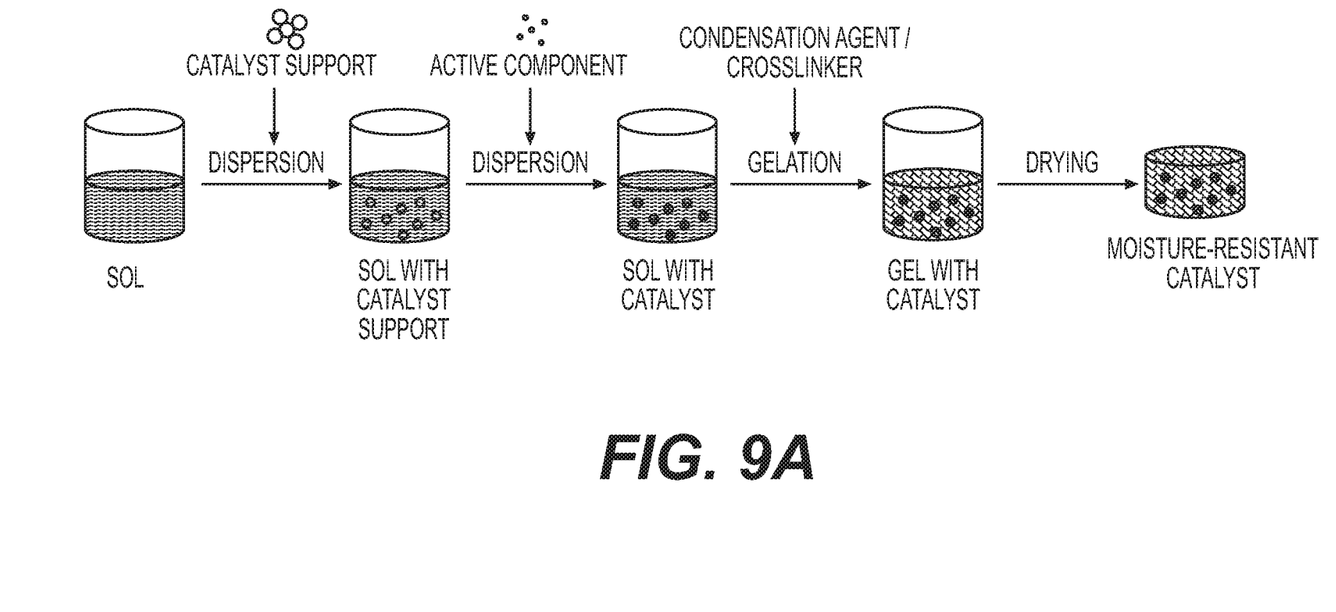
FIG. 9A schematically illustrates a one-pot synthesis-based method for making the moisture-resistant catalyst for air pollution remediation.

The moisture-resistant catalyst for air pollution remediation may be made using a one-pot synthesis method. As schematically illustrated in FIG. 9A, the at least one metal oxide catalyst and the at least one inorganic oxide support are initially dispersed into a sol, which may be an inorganic sol (e.g., metal oxides, graphene derivatives or the like), an organic sol (e.g., polymers), or an inorganic-organic hybrid sol (e.g., silicone, a metal oxide-polymer or the like). This forms a sol with an added catalyst. A condensation agent or a crosslinking agent is then added to the sol with the added catalyst to produce a catalyst-containing gel. The particular sol-gel process for producing the catalyst-containing gel is dependent upon whether the sol is an inorganic sol, an organic sol or an inorganic-organic hybrid sol. The moisture-resistant catalyst is then obtained through drying (e.g., supercritical drying, freeze drying, conventional drying or the like) and an appropriate thermal treatment processes to remove water and solvents within the catalyst-containing gel.

Figure 9B:
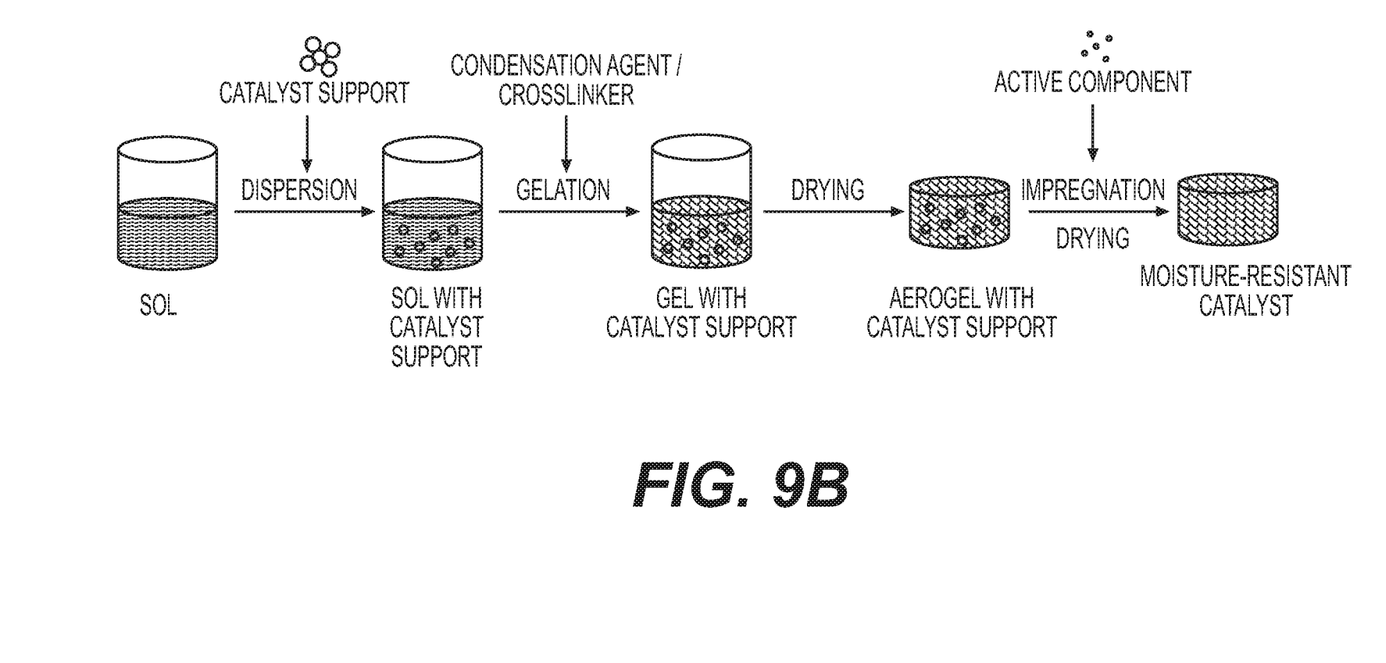
FIG. 9B schematically illustrates an impregnation-based method for making the moisture-resistant catalyst for air pollution remediation.

Alternatively, the moisture-resistant catalyst for air pollution remediation may be made using an impregnation method, where the at least one metal oxide catalyst is immobilized on the at least one inorganic oxide support. As schematically illustrated in FIG. 9B, the at least one inorganic oxide support is initially dispersed into a sol, which may be an inorganic sol (e.g., metal oxides, graphene derivatives or the like), an organic sol (e.g., polymers), or an inorganic-organic hybrid sol (e.g., silicone, a metal oxide-polymer or the like). This forms a sol with an added support. A condensation agent or a crosslinking agent is then added to the sol with the added support to produce a support-containing gel. The particular sol-gel process for producing the support-containing gel is dependent upon whether the sol is an inorganic sol, an organic sol or an inorganic-organic hybrid sol. The support-containing gel is then dried (e.g., supercritical drying, freeze drying, conventional drying or the like) to form a support-containing aerogel, and the at least one metal oxide catalyst is then immobilized on the support-containing aerogel through conventional impregnation. Further drying and appropriate thermal treatment process(es) are then applied to produce the moisture-resistant catalyst. This impregnation-based method can avoid the adverse effect of complex synthesis systems to prepare the moisture-resistant catalyst with more accessible catalytic active sites.

Figure 9C:
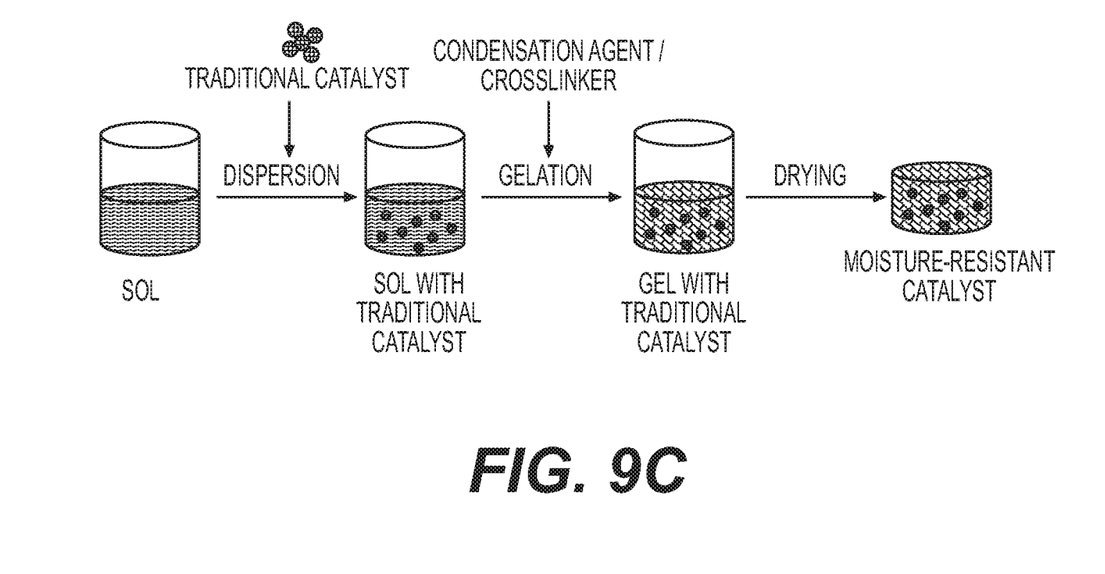
FIG. 9C schematically illustrates a physical mixing-based method for making the moisture-resistant catalyst for air pollution remediation.

As a further alternative, the moisture-resistant catalyst for air pollution remediation may be made using mixing combined with catalyst surface modification. As schematically illustrated in FIG. 9C, the at least one metal oxide catalyst is initially dispersed into a sol, which may be an inorganic sol (e.g., metal oxides, graphene derivatives or the like), an organic sol (e.g., polymers), or an inorganic-organic hybrid sol (e.g., silicone, a metal oxide-polymer or the like). This forms a sol with an added catalyst. A condensation agent or a crosslinking agent is then added to the sol with the added catalyst to produce a catalyst-containing gel. The particular sol-gel process for producing the catalyst-containing gel is dependent upon whether the sol is an inorganic sol, an organic sol or an inorganic-organic hybrid sol. The moisture-resistant catalyst is then obtained through drying (e.g., supercritical drying, freeze drying, conventional drying or the like) and an appropriate thermal treatment processes to remove water and solvents within the catalyst-containing gel.

Figure 10A:
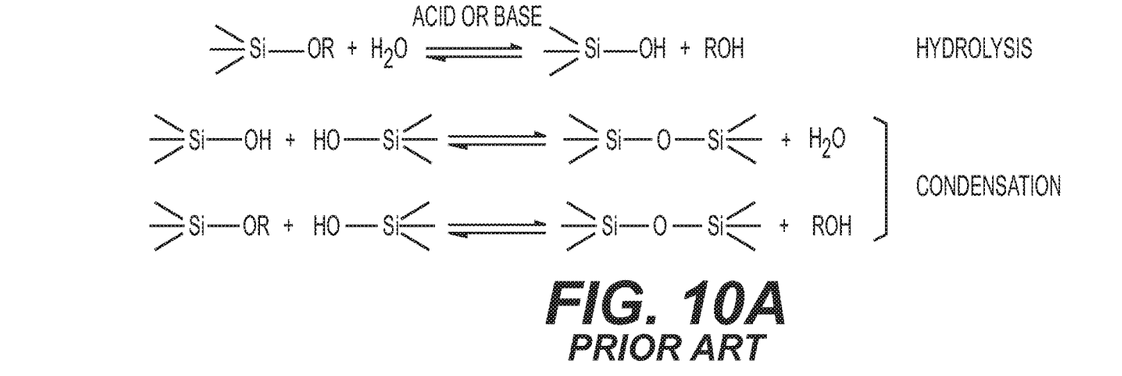
FIG. 10A illustrates a conventional sol-gel reaction for the formation of an inorganic gel.
Figure 10B:
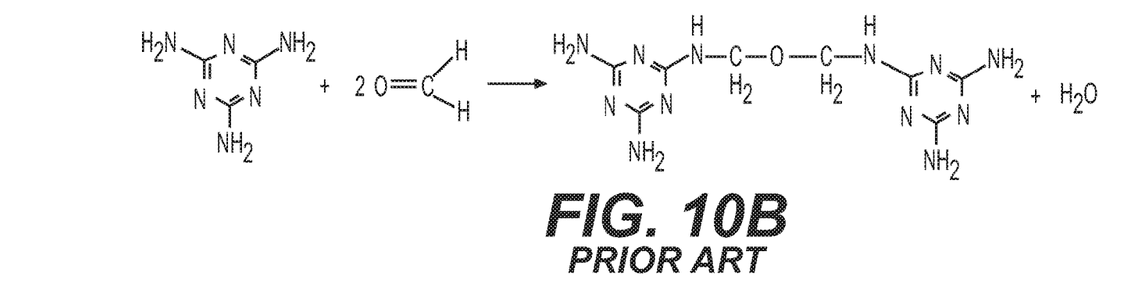
FIG. 10B illustrates a conventional sol-gel reaction for the formation of an organic gel.
Figure 10C:
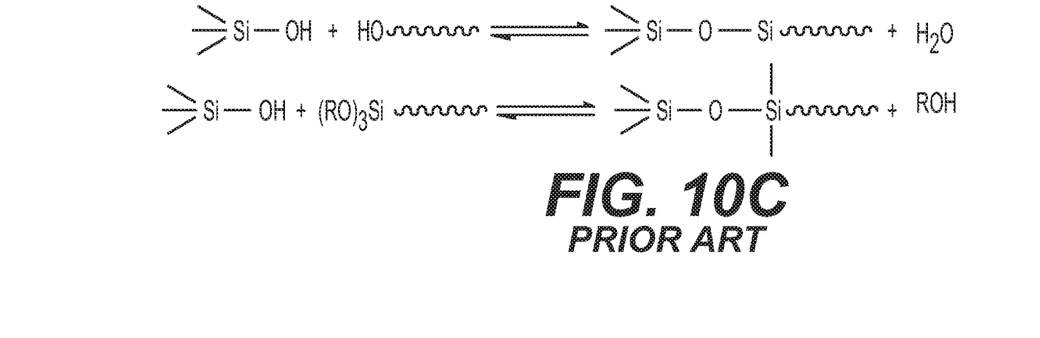
FIG. 10C illustrates a conventional sol-gel reaction for the formation of an inorganic-organic hybrid gel.

In the above methods of making the moisture-resistant catalyst, it should be understood that the sol-gel processes may be any suitable type of conventional sol-gel processes, as would be well known to one having ordinary skill in the art. As a non-limiting example, FIG. 10A illustrates a conventional sol-gel process for the formation of an inorganic gel. As a further non-limiting example, FIG. 10B illustrates a conventional sol-gel process for the formation of an organic gel. As an additional non-limiting example, FIG. 10C illustrates a conventional sol-gel process for the formation of an inorganic-organic hybrid gel. Conventional metal oxide sols, such as silica sol, titania sol or the like, may be prepared from metal alkoxides through hydrolysis and condensation processes catalyzed by acids or bases. The condensation process finally leads to solidification of sol systems to form metal oxide gels with crosslinked networks. In some of the examples given below, the condensation process of water-soluble metal salts and colloidal metal oxides is induced by acids or bases to form colloidal metal oxide gels. The sol-gel chemistry of the organic gel is generally based on the polymerization of monomers in the presence of initiators and crosslinkers. Metal oxide sols prepared from metal alkoxides can be further crosslinked with organic ligands to form inorganic-organic hybrid gels. A typical example is a silicone-based inorganic-organic hybrid gel. Another typical example is an inorganic-organic hybrid gel with bi-continuous gel networks evolved from physically mixed an inorganic sol and an organic sol. Examples 1-7 below describe the production of various sols, examples 8-17 below describe the production of various aerogels, examples 18-21 below describe the production of conventional plain metal oxide catalysts, examples 22-24 below describe the production of the present moisture-resistant catalysts, and examples 25 and 26 describe experiments for testing catalytic reactions under dry and wet conditions, respectively.

Figure 1:
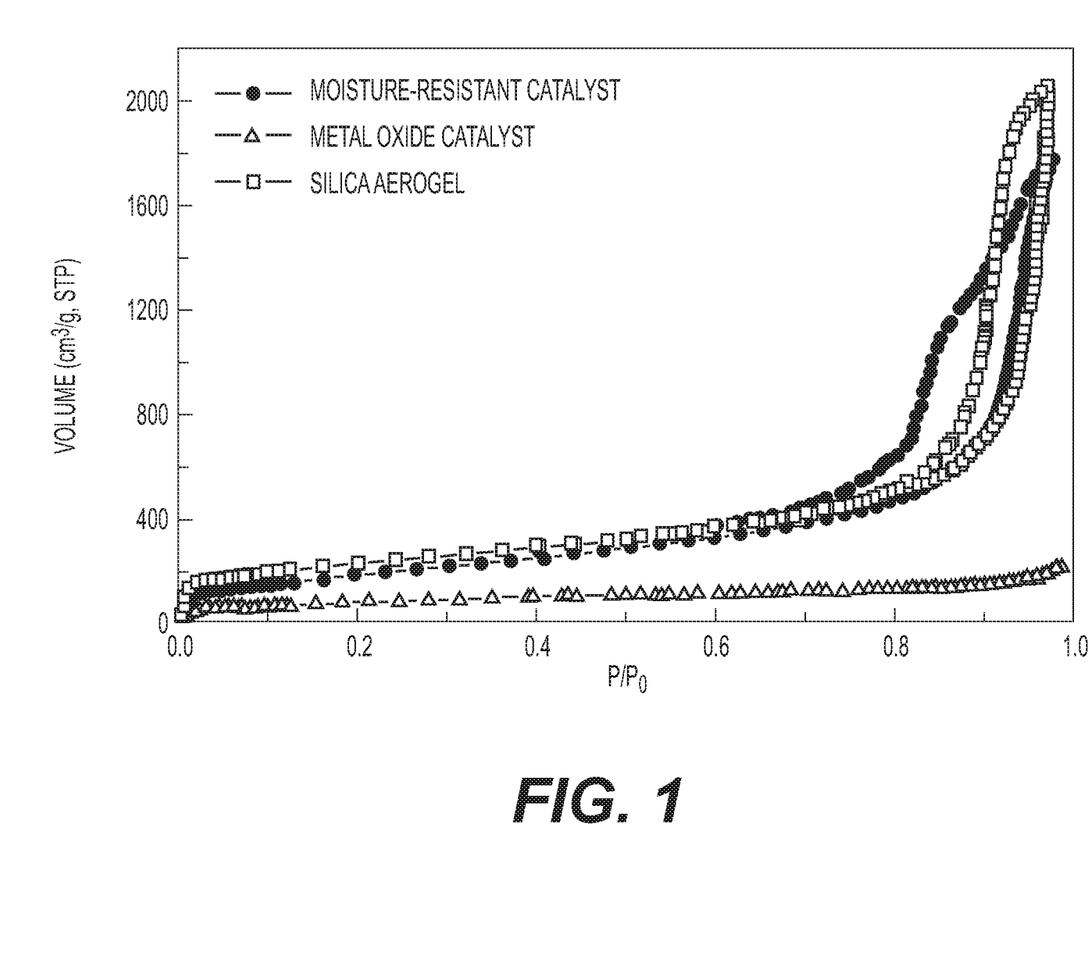
FIG. 1 is a graph comparing nitrogen adsorption/desorption isotherms of conventional silica aerogel, a conventional metal oxide catalyst, and a moisture-resistant catalyst for air pollution remediation.
Figure 2A:
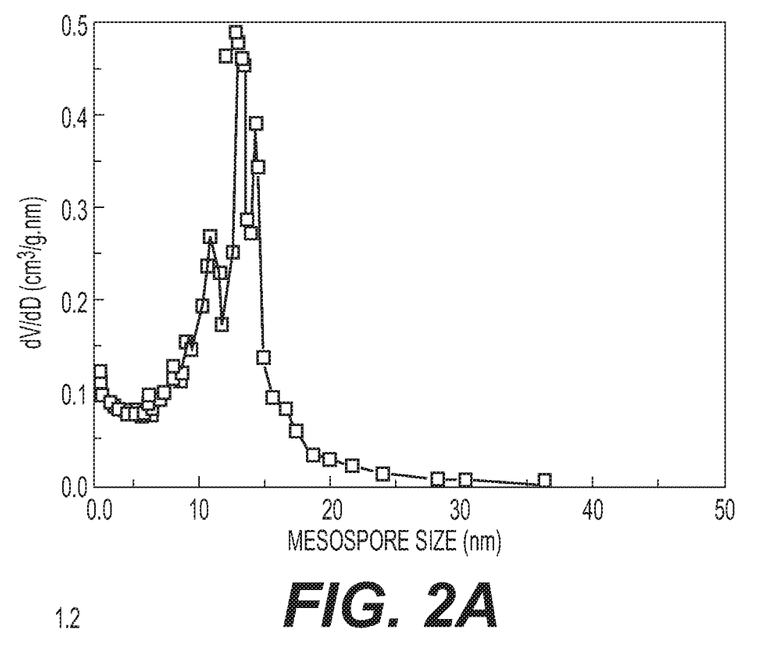
FIG. 2A is graph showing mesopore size distribution of the conventional silica aerogel.
Figure 2B:
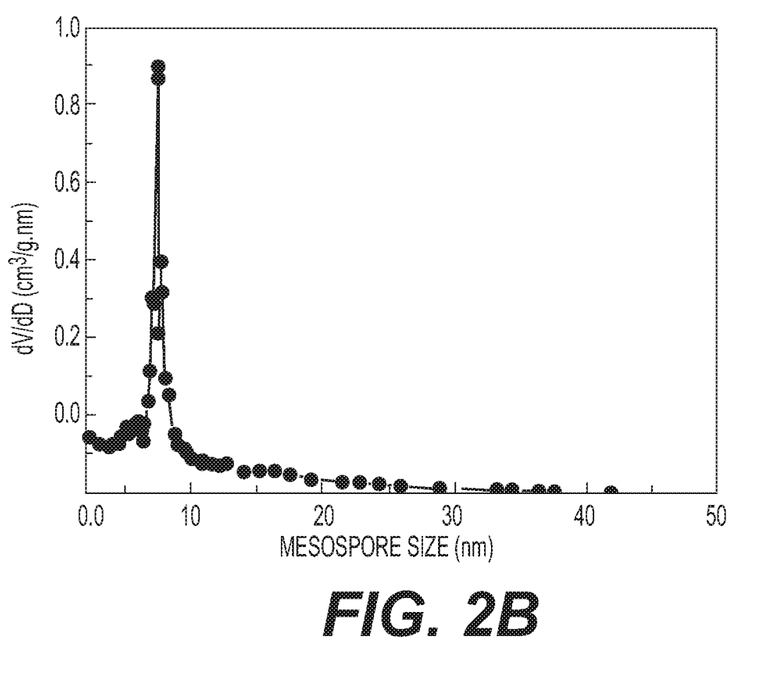
FIG. 2B is graph showing mesopore size distribution of the moisture-resistant catalyst for air pollution remediation.

In the following, nitrogen adsorption/desorption isotherms were measured at $-196°$ C. using a model SA 3100 Brunauer-Emmett-Teller (BET) surface area and pore size analyzer manufactured by Beckman Coulter®, Inc. The samples were first degassed at 250° C. under vacuum for three hours to remove adsorbed impurities in the pores of the samples prior to measurement. Mesopore size distribution was determined using the Barrett, Joyner and Halenda (BJH) method from the desorption branch. The total pore volume and micropore volume were calculated from the adsorption volume at $P/P_0=0.98$ and the Horvath-Kawazoe (HK) method from the adsorption branch, respectively. FIG. 1 shows the nitrogen adsorption/desorption isotherms of plain silica aerogel, a plain metal oxide catalyst and the present moisture-resistant catalyst, prepared as described above. Table 1 below lists their specific surface area and pore structure data obtained from the isotherms. The plain metal oxide catalyst exhibits the lowest specific surface area from intercrystalline pores. The silica aerogel and the moisture-resistant catalyst have typical mesoporous structures, indicated by hysteresis loops in their isotherms. They also contain some micropores. The total pore volumes of the silica aerogel and the moisture-resistant catalyst are more than 9 times of that of the initial metal oxide catalyst. FIG. 2A shows the mesopore size distribution of the silica aerogel, and FIG. 2B shows the mesopore size distribution of the moisture-resistant catalyst. As shown, they have uniform mesopore size distributions centralized at 13 nm and 7 nm, respectively.

TABLE 1

Surface Area and Pore Structure Data for Silica Aerogel,
Metal Oxide Catalyst and Moisture-Resistant Catalyst

| Sample | $S_{BET}$ (m²/g) | $V_{Total}$ (cm³/g) | $V_{Micro}$ (cm³/g) | $D_{Meso}$ (nm) |
|---|---|---|---|---|
| Silica aerogel | 833.1 | 3.04 | 0.36 | 12.8 |
| Metal oxide catalyst | 283.1 | 0.30 | 0.12 | — |
| Moisture-resistant catalyst | 685.1 | 2.73 | 0.28 | 7.3 |

Figure 3:
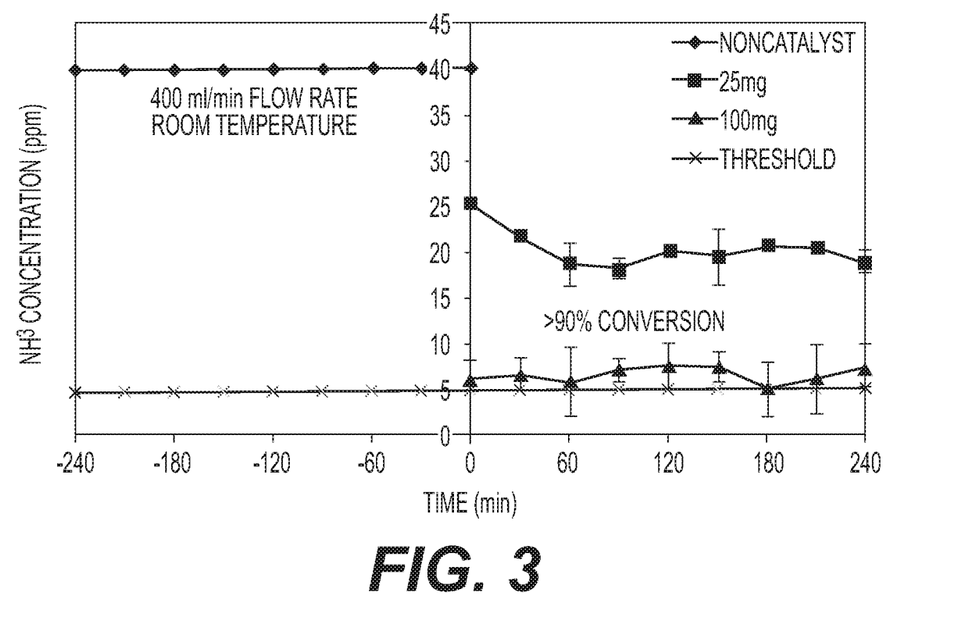
FIG. 3 is a graph showing ammonia ($NH_3$) concentration as a function of time for the conventional metal oxide catalyst (shown for two different loadings of the catalyst) at room temperature under dry conditions.
Figure 4:
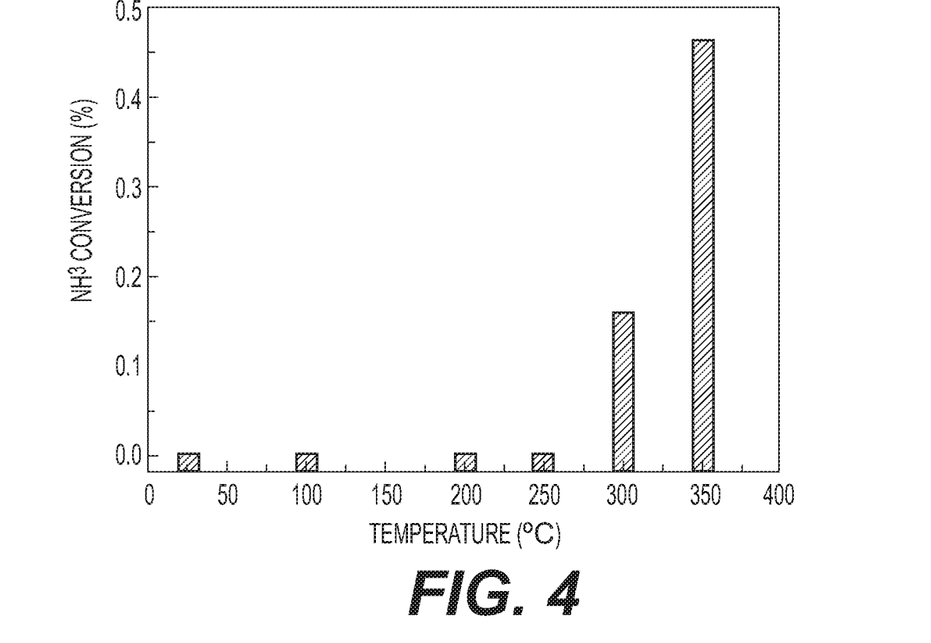
FIG. 4 is a graph showing ammonia ($NH_3$) conversion as a function of temperature for the conventional metal oxide catalyst under a relative humidity of 100%.

FIG. 3 shows $NH_3$ concentration vs. time curves of the plain metal oxide catalyst at room temperature and under dry conditions. The metal oxide catalyst (25 mg) is able to convert $NH_3$ at more than 50% conversion for 40 ppm $NH_3$ in 400 ml/min of air at room temperature. When the catalyst loading was increased to 100 mg, 90% $NH_3$ conversion was reached to lower the ammonia concentration near the odor threshold. These results verify that the metal oxide catalyst is highly active. However, when the metal oxide catalyst was operated under harsh conditions (i.e., high $NH_3$ concentration and relative humidity), its catalytic activity was very low (below 250° C.). $NH_3$ conversions remarkably increased when operating temperatures were elevated to more than 300° C. as $NH_3$ conversions on the metal oxide catalyst, as shown in FIG. 4.

Figure 5:
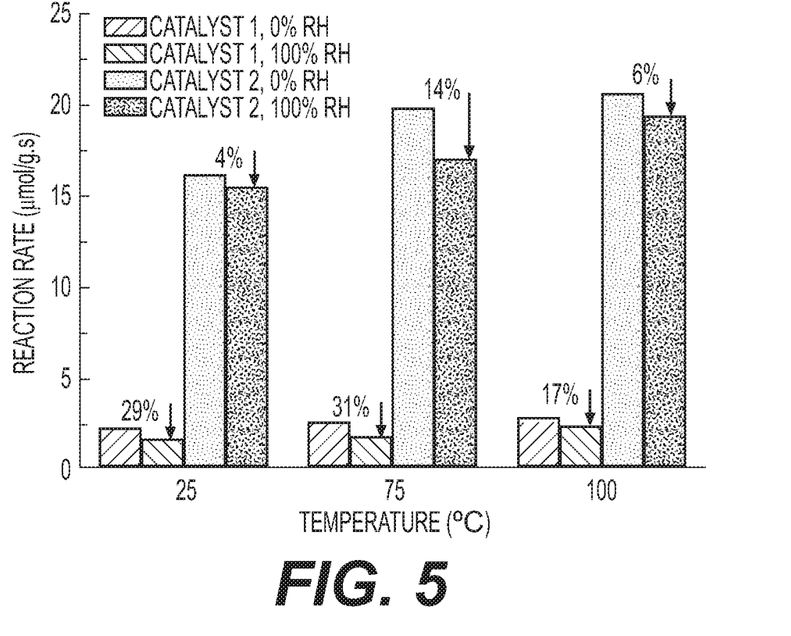
FIG. 5 is a graph comparing reaction rates of ammonia ($NH_3$) oxidation for the conventional metal oxide catalyst (shown as "Catalyst 1") under 0% relative humidity (RH) and 100% RH and the moisture-resistant catalyst for air pollution remediation (shown as "Catalyst 2") under 0% RH and 100% RH.

FIG. 5 shows a comparison of the catalytic reaction rates of $NH_3$ oxidation on the plain metal oxide catalysts and corresponding moisture-resistant catalysts under different conditions. With the elevation of operating temperature, all catalysts exhibited higher catalytic activities. Wet operating condition resulted in obviously decreased catalytic activity of the metal oxide catalysts. The moisture-resistant catalysts contributed at least five times higher reaction rates than the metal oxide catalysts. Further, high relative humidity slightly decreased the catalytic activity of the moisture-resistant catalysts.

Figure 6:
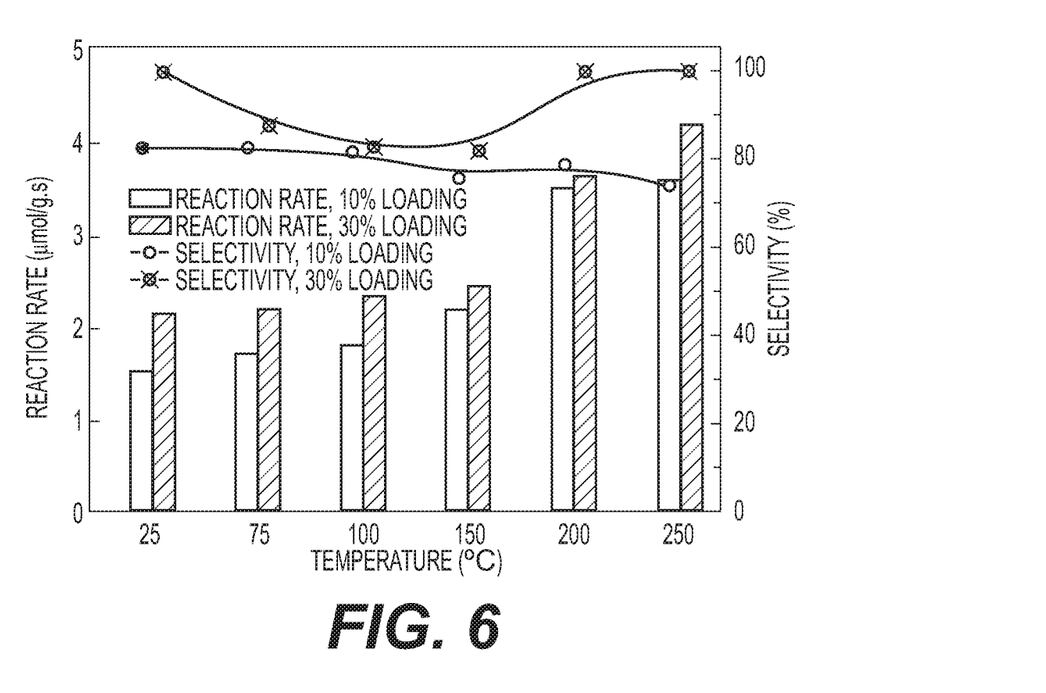
FIG. 6 is a graph comparing reaction rates of ammonia ($NH_3$) oxidation and nitrogen selectivity for the conventional metal oxide catalyst at inhibitor loadings of 10% and 30% at varying temperatures under dry conditions.
Figure 7:
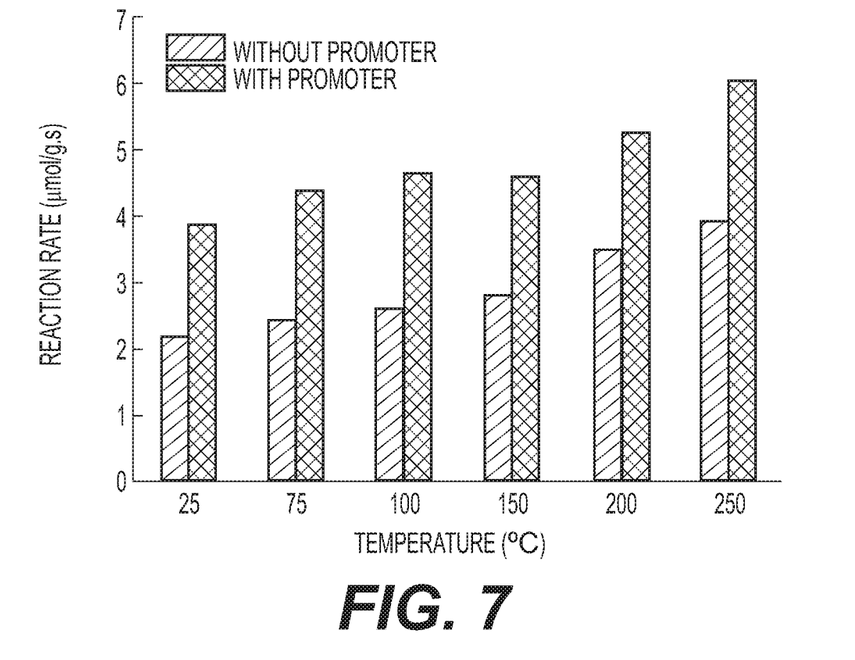
FIG. 7 is a graph comparing reaction rates of ammonia ($NH_3$) oxidation for the conventional metal oxide catalyst with promoters and without promoters at varying temperatures under dry conditions.
Figure 8:
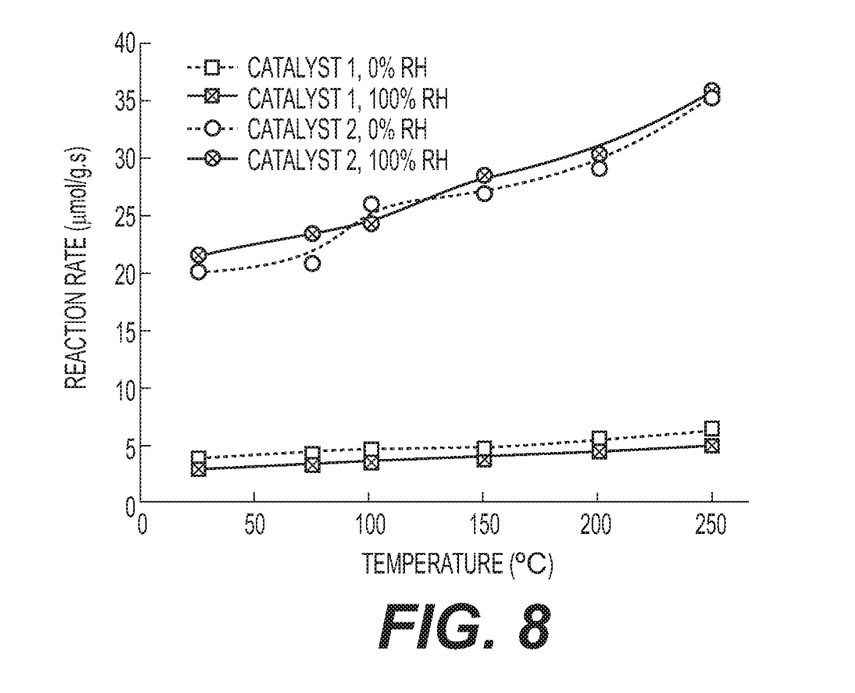
FIG. 8 is a graph comparing reaction rates of ammonia ($NH_3$) oxidation for the conventional metal oxide catalyst (shown as "Catalyst 1") with promoters under 0% relative humidity (RH) and 100% RH and the moisture-resistant catalyst for air pollution remediation (shown as "Catalyst 2") under 0% RH and 100% RH at varying temperatures.

FIG. 6 compares the catalytic reaction rates of $NH_3$ oxidation and nitrogen selectivities on the plain metal oxide catalysts with different inhibitor loadings. With the increase of inhibitor loading, the catalytic activities of the metal oxide catalysts at low temperatures are remarkably improved. High inhibitor loading also avoids the deep oxidation of $NH_3$ to form nitrogen oxide products. FIG. 7 compares the catalytic reaction rates of $NH_3$ oxidation on the metal oxide catalysts without and with promoters at different temperatures. The promoters significantly enhance catalytic activities of the metal oxide catalyst in the full range of operating temperatures. FIG. 8 shows the catalytic reaction rates of $NH_3$ oxidation on the metal oxide catalysts with promoters and the corresponding moisture-resistant catalysts under different temperatures and relative humidities. The moisture-resistant catalysts exhibit much higher catalytic activities than the metal oxide catalyst with promoters. Relative humidity is shown not to affect the catalytic activities of the moisture-resistant catalysts.

Example 1

Silica sol was prepared by adding diluted nitric acid (0.14 mol/l, 9.6 ml) to tetraethyl orthosilicate (30 ml) under stirring, followed by heating at 50° C. for 3 hours to obtain a clear silica sol.

Example 2

Alumina sol was prepared by dispersing commercial pseudoboehmite powder (3.4 g) into DDI water (47 ml) under vigorous stirring, followed by heating at 80° C. and adding diluted nitric acid (1.6 mol/l, 1.8 ml). The obtained mixture was further stirred at 80° C. for 6 hours to obtain a clear alumina sol (1 mol/l).

Example 3

A titania sol was prepared by dissolving titanium isopropoxide (10 ml) in isopropanol (23.6 ml), followed by adding $HNO_3$ (2 mol/l, 3.4 ml) and DDI water (31.4 ml) under vigorous stirring to obtain an opaque suspension. The suspension was further stirred at 80° C. to evaporate isopropanol and peptizing titania precipitate, followed by cooling down to room temperature and stirring overnight to obtain a clear titania sol (1 mol/l).

Example 4

Zirconia sol was prepared by dissolving zirconium isopropoxide (11 g) in isopropanol (23.6 ml), followed by adding $HNO_3$ (2 mol/l, 3.4 ml) and DDI water (31.4 ml) under vigorous stirring to obtain an opaque suspension. The suspension was further stirred at 80° C. to evaporate isopropanol and peptizing zirconia precipitate, followed by cooling down to room temperature and stirring overnight to obtain a clear zirconia sol (1 mol/l).

Example 5

A silica-alumina sol was prepared by adding tetraethyl orthosilicate (22 ml) to acidic boehmite sol (0.2 mol/l, 50 ml) under vigorous stirring, followed by stirring for 24 hours at room temperature to form a clear silica-alumina sol with a Si/Al ratio of 10.

Example 6

A silica-titania sol was prepared by adding tetraethyl orthosilicate (22 ml) to titania sol (1 mol/l, 50 ml) under vigorous stirring, followed by stirring for 24 hours at room temperature to form a clear silica-titania sol with a Si/Ti ratio of 2.

Example 7

A silica-zirconia sol was prepared by adding tetraethyl orthosilicate (22 ml) to zirconia sol (0.2 mol/l, 50 ml) under vigorous stirring, followed by stirring for 24 hours at room temperature to form a clear silica-zirconia sol with a Si/Zr ratio of 10.

Example 8

A silica aerogel was formed by adding weak basic reagents, including sodium carbonate solution, ammonia solution and a colloidal silica dispersion, to an acidic silica sol to induce a slow condensation process for silica gel formation. The gelation time is adjustable by concentration and the amount of weak basic reagents to form gel networks with monolithic morphology and enough mechanical strength. It should be noted that a too rapid or too slow gelation process results in the precipitation of silica sol or soft gel networks. Water and solvents of silica gel were removed by supercritical drying (or freeze drying) and further thermal treatment under different atmospheres to obtain a silica aerogel. The silica aerogel can be further functionalized with silanes, such as methyltrimethoxysilane, methyltriethoxysilane, phenyltrimethoxysilane or hexamethyldisilazane to increase its hydrophobicity.

Example 9

A silica-alumina aerogel was prepared from the silica-alumina sol of Example 5 by similar processes of base-induced condensation, drying and thermal treatment according to that described in Example 8.

Example 10

A silica-titania aerogel was prepared from the silica-titania sol of Example 6 by similar processes of base-induced condensation, drying and thermal treatment according to that described in Example 8.

Example 11

A silica-zirconia aerogel was prepared from the silica-zirconia sol of Example 7 by similar processes of base-induced condensation, drying and thermal treatment according to those described in Example 8.

Example 12

A graphene aerogel was prepared from graphene oxide nanosheets, which were made using a modified Hummers method, and which were dispersed in DDI water with a concentration range of 1-10 mg/ml, followed by adding crosslinkers containing amino groups, such as ethylenediamine and polyethylenimine. The obtained suspension was hydrothermal-treated through a conventional oven or a microwave oven to prepare a graphene gel. The graphene aerogel was prepared from the graphene gel by supercritical drying or freeze drying.

Example 13

A resorcinol-formaldehyde aerogel was prepared by dissolving resorcinol and formaldehyde, with molar ratio of 1:2, in DDI water, followed by adding sodium carbonate solution and heating at 85° C. for several days to obtain the resorcinol-formaldehyde gel. The gel was placed into an acetic acid solution (5%) to increase the crosslinking density of gel networks. Finally, a supercritical drying process was carried out to obtain the resorcinol-formaldehyde aerogel.

Example 14

A polymer aerogel was prepared from polymer gels, which were made through a polymerization process of monomers in the presence of initiators and crosslinkers. In a typical example, biphenyl-3,3',4,4'-tetracarboxylic diandride (4.8 g) and 4,4'-oxydianiline (3.2 g) were dissolved in N-methylpyrrolidinone (50 ml), followed by adding 1,3,5-triaminophenoxybenzene solution in N-methylpyrrolidinone (0.2 g in 16 ml) under stirring. Then, acetic anhydride (12.3 ml) and pyridine (10.5 ml) were added to the above solution to obtain a polyimide gel. The obtained polyimide gel was further aged for 24 hours, followed by solvent exchange and supercritical drying to obtain the polyimide aerogel.

Example 15

Carbonaceous and carbon aerogels were prepared by carbonizing the resorcinol-formaldehyde aerogel of Example 13, or other polymer aerogels, at low and high temperatures and in inert atmospheres, respectively.

Example 16

Inorganic-organic aerogels with a single network were prepared from inorganic-organic gels with a single network. Generally, the inorganic-organic gels with a single network were prepared by a co-condensation process of metal alkoxides and corresponding organic ligands. In a typical example, methyltriethoxysilane (5.4 ml) was dissolved in malonic acid aqueous solution (0.1%, 10 ml), followed by adding glucose (1 g) and dimethoxydimethylsilane (2.2 ml) under stirring. Urea (4 g) and cetyltrimethylammonium chloride (1 g) was added into the above solution under stirring to obtain a silicone-based inorganic-organic sol. A silicone-based inorganic-organic gel was prepared by heating the sol at 75° C. for 4 hours, followed by drying at 120° C. to obtain the silicone-based inorganic-organic aerogel.

Example 17

Inorganic-organic aerogels with bi-continuous networks were prepared from inorganic-organic gels with bi-continuous networks. The inorganic-organic gels with bi-continuous networks were prepared by mixing metal oxide sols (described above in Examples 1-7) or a graphene oxide dispersion (described in Example 12) and resorcinol-formaldehyde or monomer solutions (described in Examples 13 and 14) and adjusting their gelation processes with condensation agents and crosslinkers. Inorganic-organic aerogels with bi-continuous networks were obtained after solvent exchange and supercritical drying processes.

Example 18

Metal oxide catalysts were prepared by supporting active components selected from Group IB, IIB, IIIB, IVB, VB, VIB, VIIB and VIIIB elements on metal oxide supports selected from Group IIIA, IVA and IVB elements. A typical example is a vanadium oxide catalyst supported on titania. Ammonium metavanadate (0.1 g) was dissolved in DDI water (50 ml) under vigorous stirring, followed by adding a titania support (0.5 g). The obtained suspension was dried at 60° C. using a rotary evaporator under vacuum, and further dried at 120° C. for 24 hours and calcined at 250° C. in air for 6 hours to obtain a $VO_x/TiO_2$ catalyst.

Example 19

Metal oxide catalysts with promoters were prepared using promoters selected from Group IVB and VB elements, which were added into an active component aqueous solution to prepare the metal oxide catalysts with promoters for enhanced catalytic activity. The process used was similar to the procedure given above in Example 18. In a typical example, zirconium oxynitrate hydrate (0.1 g) and ammonium metavanadate (0.1 g) were dissolved in DDI water (50 ml) under vigorous stirring, followed by adding a titania support (0.5 g). The obtained suspension was dried at 60° C. using a rotary evaporator under vacuum, and further dried at 120° C. for 24 hours and calcined at 400° C. in air for 6 hours to obtain a $ZrO_2$—$VO_x/TiO_2$ catalyst.

Example 20

Metal oxide catalysts with inhibitors were prepared using inhibitors selected from Group IB, IIIB and VIIIB elements, which were added into the active component aqueous solution to prepare metal oxide catalysts with inhibitors for improved catalytic selectivity. The process used was similar to that described above in Example 18. In a typical example, copper nitrate trihydrate (0.45 g) and ammonium metavanadate (0.1 g) were dissolved in DDI water (50 ml) under vigorous stirring, followed by adding a titania support (0.5 g). The obtained suspension was dried at 60° C. using a rotary evaporator under vacuum, and further dried at 120° C. for 24 hours and calcined at 400° C. in air for 6 hours to obtain a $CuO$—$VO_x/TiO_2$ catalyst.

Example 21

Metal oxide catalysts with stabilizers were prepared using stabilizers selected from Group IIIA, IVA and IVB elements, which were added to the active component aqueous solution to prepare metal oxide catalysts with stabilizers for improved catalyst stability. The process used was similar to that described above in Example 18. In a typical example, ammonium metavanadate (0.1 g) was dissolved in DDI water (50 ml) under vigorous stirring, followed by adding a titania support (0.4 g) and a colloidal silica stabilizer suspension (40%, 0.13 g). The obtained suspension was dried at 60° C. using a rotary evaporator under vacuum, and further dried at 120° C. for 24 hours and calcined at 400° C. in air for 6 hours to obtain a $VO_x/SiO_2$—$TiO_2$ catalyst.

Example 22

The moisture-resistant catalyst was prepared using catalytic active components selected from Group IB, IIB, IIIB, IVB, VB, VIB, VIIB and VIIIB elements and catalyst supports selected from Group IIIA, IVA and IVB elements, which were dispersed into inorganic sols (described in Examples 1-7, 12 and 15), organic sols (described in Examples 13 and 14) and inorganic-organic sols (described in Examples 16 and 17), followed by gelation in the presence of condensation agents or crosslinkers to prepare gels with catalysts. The moisture-resistant catalyst was obtained after drying and thermal treatment.

Example 23

The moisture-resistant catalyst was also prepared using inorganic aerogels (described in Examples 8-12 and 15), organic aerogels (described in Examples 13 and 14) and inorganic-organic aerogels (described in Examples 16 and 17), which are used as supports to immobilize catalytic active components selected from Group IB, IIB, IIIB, IVB, VB, VIB, VIIB and VIIIB elements by conventional impregnation, drying and a thermal treatment processes to prepare the moisture-resistant catalyst.

Example 24

The moisture-resistant catalyst was further prepared from metal oxide catalysts (described in Examples 18-21), which are dispersed into inorganic sols (described in Examples 1-7, 12 and 15), organic sols (described in Examples 13 and 14) and inorganic-organic sols (described in Examples 16 and 17), followed by gelation in the presence of condensation agents or crosslinkers to prepare gels with metal oxide catalysts. The moisture-resistant catalyst is obtained after drying and thermal treatment.

Example 25

Catalytic oxidation reactions were tested, under dry conditions, in a fixed bed reactor fed with synthetic air containing different concentrations of nitrogen-containing compounds. The operating temperature was controlled with heating tape, a thermocouple and a thermal controller. The metal oxide catalysts and moisture-resistant catalysts were pre-treated in synthetic air at 250° C. for 2 hours. The reaction products were analyzed online by a 6890 Series gas chromatograph, manufactured by Agilent®, and equipped with an Alltech® column, manufactured by W. R. Grace & Co., packed with Hayesep® Q 80/100, manufactured by Hayes Separation, Inc., and a thermal conductivity detector.

Example 26

Catalytic oxidation reactions were tested, under wet conditions, in a fixed bed reactor fed with synthetic air containing different concentrations of nitrogen-containing compounds and saturated water vapor. The operating temperature was controlled with a heating tape, a thermocouple and a thermal controller. The metal oxide catalysts and moisture-resistant catalysts were pre-treated in synthetic air at 250° C. for 2 hours. The reaction products were analyzed online by a 6890 Series gas chromatograph, manufactured by Agilent®, and equipped with an Alltech® column, manufactured by W. R. Grace & Co., packed with Hayesep® Q 80/100, manufactured by Hayes Separation, Inc., and a thermal conductivity detector.

It is to be understood that the moisture-resistant catalyst for air pollution remediation and the method of making the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A moisture-resistant catalyst for air pollution remediation, comprising:
   at least one metal oxide catalyst;
   at least one inorganic oxide support for supporting the at least one metal oxide catalyst; and
   a hydrophobic porous framework for immobilizing the at least one metal oxide catalyst and the at least one inorganic oxide support, wherein the porous framework comprises an inorganic aerogel or at least one hydrophobic polymer and at least one inorganic component and the porous framework is moisture-resistant, the at least one metal oxide catalyst and the at least one inorganic oxide support being embedded in the hydrophobic porous framework.

2. The moisture-resistant catalyst for air pollution remediation as recited in claim 1, wherein the at least one metal oxide catalyst is an oxide selected from the group consisting of copper, silver, gold, zinc, cadmium, mercury, scandium, yttrium, lanthanum, cerium, titanium, zirconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, rhodium, iridium, meitnerium, nickel, palladium, platinum, darmstadtium and combinations thereof.

3. The moisture-resistant catalyst for air pollution remediation as recited in claim 1, wherein the at least one metal oxide catalyst is an oxide selected from the group consisting of copper, zinc, yttrium, lanthanum, cerium, titanium, zirconium, vanadium, chromium, manganese, iron, cobalt, nickel and combinations thereof.

4. The moisture-resistant catalyst for air pollution remediation as recited in claim 1, wherein the at least one inorganic oxide support is an oxide selected from the group consisting of aluminum, gallium, indium, thallium, nihonium, silicon, germanium, tin, lead, flerovium, titanium, zirconium, hafnium, rutherfordium and combinations thereof.

5. The moisture-resistant catalyst for air pollution remediation as recited in claim 1, wherein the at least one inorganic oxide support is an oxide selected from the group consisting of aluminum, silicon, titanium, zirconium and combinations thereof.

6. The moisture-resistant catalyst for air pollution remediation as recited in claim 1, wherein the inorganic aerogel is selected from the group consisting of a silica aerogel, a titania-silica aerogel, a silicon nitride aerogel, a graphene aerogel, a carbon aerogel and a carbonaceous material aerogel.

7. The moisture-resistant catalyst for air pollution remediation as recited in claim 1, wherein the at least one hydrophobic polymer is selected from the group consisting of polyacrylates, polyamides, polycarbonates, polyfluorocarbons, polystyrenes, polyimides, resorcinol-formaldehyde polymers and combinations thereof.

8. The moisture-resistant catalyst for air pollution remediation as recited in claim 1, wherein the at least one inorganic component is selected from the group consisting of silica, titania-silica, silicon nitride, graphene, carbon and carbonaceous materials.

9. The moisture-resistant catalyst for air pollution remediation as recited in claim 1, further comprising a promoter.

10. The moisture-resistant catalyst for air pollution remediation as recited in claim 9, wherein the promoter is selected from the group consisting of titanium, zirconium, hafnium, rutherfordium, vanadium, niobium, tantalum, dubnium and combinations thereof.

11. The moisture-resistant catalyst for air pollution remediation as recited in claim 1, further comprising a stabilizer.

12. The moisture-resistant catalyst for air pollution remediation as recited in claim 11, wherein the stabilizer is selected from the group consisting of boron, aluminum, gallium, indium, thallium, nihonium, carbon, silicon, germanium, tin, lead, flerovium, titanium, zirconium, hafnium, rutherfordium and combinations thereof.

13. The moisture-resistant catalyst for air pollution remediation as recited in claim 1, further comprising an inhibitor.

14. The moisture-resistant catalyst for air pollution remediation as recited in claim 13, wherein the inhibitor is selected from the group consisting of copper, silver, gold, scandium, yttrium, lanthanum, cerium, iron, ruthenium, osmium, hassium, cobalt, rhodium, iridium, meitnerium, nickel, palladium, platinum, darmstadtium and combinations thereof.

15. A method of making a moisture-resistant catalyst, comprising the steps of:
dispersing at least one metal oxide catalyst and at least one inorganic oxide support in a sol to form a sol with an added catalyst;
adding an agent to the sol with the added catalyst to form a catalyst-containing gel through a sol-gel process, wherein the agent is selected from the group consisting of a condensation agent and a crosslinking agent; and
drying the catalyst-containing gel to yield a moisture-resistant catalyst, whereby the moisture-resistant catalyst includes at least one metal oxide catalyst, at least one inorganic oxide support for supporting the at least one metal oxide catalyst, and a hydrophobic porous framework for immobilizing the at least one metal oxide catalyst and the at least one inorganic oxide support, wherein the porous framework comprises an inorganic aerogel or at least one hydrophobic polymer and at least one inorganic component and the porous framework is moisture-resistant, the at least one metal oxide catalyst and the at least one inorganic oxide support being embedded in the hydrophobic porous framework.

16. The method of making a moisture-resistant catalyst as recited in claim 15, wherein the step of dispersing the at least one metal oxide catalyst and the at least one inorganic oxide support in the sol comprises dispersing the at least one metal oxide catalyst and the at least one inorganic oxide support in a sol selected from the group consisting of an inorganic sol, an organic sol and an inorganic-organic hybrid sol.

17. The method of making a moisture-resistant catalyst as recited in claim 16, wherein the at least one metal oxide catalyst is an oxide selected from the group consisting of copper, silver, gold, zinc, cadmium, mercury, scandium, yttrium, lanthanum, cerium, titanium, zirconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, rhodium, iridium, meitnerium, nickel, palladium, platinum, darmstadtium and combinations thereof.

18. The method of making a moisture-resistant catalyst as recited in claim 16, wherein the at least one metal oxide catalyst is an oxide selected from the group consisting of copper, zinc, yttrium, lanthanum, cerium, titanium, zirconium, vanadium, chromium, manganese, iron, cobalt, nickel and combinations thereof.

19. The method of making a moisture-resistant catalyst as recited in claim 16, wherein the at least one inorganic oxide support is an oxide selected from the group consisting of aluminum, gallium, indium, thallium, nihonium, silicon, germanium, tin, lead, flerovium, titanium, zirconium, hafnium, rutherfordium and combinations thereof.

20. The method of making a moisture-resistant catalyst as recited in claim 16, wherein the at least one inorganic oxide support is an oxide selected from the group consisting of aluminum, silicon, titanium, zirconium and combinations thereof.

21. A method of making a moisture-resistant catalyst, comprising the steps of:
dispersing at least one inorganic oxide support in a sol to form a sol with an added support;
adding an agent to the sol with the added support to form a support-containing gel through a sol-gel process, wherein the agent is selected from the group consisting of a condensation agent and a crosslinking agent; and
drying the support-containing gel to form a support-containing aerogel;
immobilizing at least one metal oxide catalyst on the support-containing aerogel through an impregnation process; and
drying the support-containing aerogel and the at least one metal oxide catalyst to yield a moisture-resistant catalyst, whereby the moisture-resistant catalyst includes at least one metal oxide catalyst, at least one inorganic oxide support for supporting the at least one metal oxide catalyst, and a hydrophobic porous framework for immobilizing the at least one metal oxide catalyst and the at least one inorganic oxide support, wherein the porous framework comprises an inorganic aerogel or at least one hydrophobic polymer and at least one inorganic component and the porous framework is moisture-resistant, the at least one metal oxide catalyst and the at least one inorganic oxide support being embedded in the hydrophobic porous framework.

22. The method of making a moisture-resistant catalyst as recited in claim 21, wherein the step of dispersing the at least one inorganic oxide support in the sol comprises dispersing the at least one inorganic oxide support in a sol selected from the group consisting of an inorganic sol, an organic sol and an inorganic-organic hybrid sol.

23. The method of making a moisture-resistant catalyst as recited in claim 22, wherein the at least one inorganic oxide support is an oxide selected from the group consisting of aluminum, gallium, indium, thallium, nihonium, silicon, germanium, tin, lead, flerovium, titanium, zirconium, hafnium, rutherfordium and combinations thereof.

24. The method of making a moisture-resistant catalyst as recited in claim 22, wherein the at least one inorganic oxide support is an oxide selected from the group consisting of aluminum, silicon, titanium, zirconium and combinations thereof.

25. The method of making a moisture-resistant catalyst as recited in claim 21, wherein the at least one metal oxide catalyst is an oxide selected from the group consisting of copper, silver, gold, zinc, cadmium, mercury, scandium, yttrium, lanthanum, cerium, titanium, zirconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, rhodium, iridium, meitnerium, nickel, palladium, platinum, darmstadtium and combinations thereof.

26. The method of making a moisture-resistant catalyst as recited in claim 21, wherein the at least one metal oxide catalyst is an oxide selected from the group consisting of copper, zinc, yttrium, lanthanum, cerium, titanium, zirconium, vanadium, chromium, manganese, iron, cobalt, nickel and combinations thereof.

27. A method of making a moisture-resistant catalyst, comprising the steps of:
dispersing at least one metal oxide catalyst in a sol to form a sol with an added catalyst;
adding an agent to the sol with the added catalyst to form a catalyst-containing gel through a sol-gel process, wherein the agent is selected from the group consisting of a condensation agent and a crosslinking agent; and
drying the catalyst-containing gel to yield a moisture-resistant catalyst, whereby the moisture-resistant catalyst comprises at least one metal oxide catalyst, at least one inorganic oxide support for supporting the at least one metal oxide catalyst, and a hydrophobic porous framework for immobilizing the at least one metal oxide catalyst and the at least one inorganic oxide support, wherein the porous framework comprises an inorganic aerogel or at least one hydrophobic polymer and at least one inorganic component and the porous framework is moisture-resistant, the at least one metal oxide catalyst and the at least one inorganic oxide support being embedded in the hydrophobic porous framework.

28. The method of making a moisture-resistant catalyst as recited in claim 27, wherein the step of dispersing the at least one metal oxide catalyst in the sol comprises dispersing the at least one metal oxide catalyst in a sol selected from the group consisting of an inorganic sol, an organic sol and an inorganic-organic hybrid sol.

29. The method of making a moisture-resistant catalyst as recited in claim 28, wherein the at least one metal oxide catalyst is an oxide selected from the group consisting of copper, silver, gold, zinc, cadmium, mercury, scandium, yttrium, lanthanum, cerium, titanium, zirconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, rhodium, iridium, meitnerium, nickel, palladium, platinum, darmstadtium and combinations thereof.

30. The method of making a moisture-resistant catalyst as recited in claim 28, wherein the at least one metal oxide catalyst is an oxide selected from the group consisting of copper, zinc, yttrium, lanthanum, cerium, titanium, zirconium, vanadium, chromium, manganese, iron, cobalt, nickel and combinations thereof.

* * * * *